US012688478B2

(12) United States Patent
Kumar et al.

(10) Patent No.: US 12,688,478 B2
(45) Date of Patent: Jul. 21, 2026

(54) METHOD AND SYSTEM FOR IDENTIFICATION AND ANALYSIS OF REGIME SHIFT

(71) Applicant: Tata Consultancy Services Limited, Mumbai (IN)

(72) Inventors: Rajan Kumar, Pune (IN); Vivek Kumar, Pune (IN); Manendra Singh Parihar, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 739 days.

(21) Appl. No.: 17/753,477

(22) PCT Filed: Aug. 25, 2020

(86) PCT No.: PCT/IN2020/050745
§ 371 (c)(1),
(2) Date: Mar. 3, 2022

(87) PCT Pub. No.: WO2021/059291
PCT Pub. Date: Apr. 1, 2021

(65) Prior Publication Data
US 2022/0343255 A1 Oct. 27, 2022

(30) Foreign Application Priority Data
Sep. 27, 2019 (IN) .............................. 201921039286

(51) Int. Cl.
*G06Q 10/0639* (2023.01)
(52) U.S. Cl.
CPC .............................. *G06Q 10/06393* (2013.01)
(58) Field of Classification Search
CPC ................ G05B 19/406; G05B 23/024; G06Q 10/0639; G06Q 10/06393; G06Q 50/04;
(Continued)

(56) References Cited

U.S. PATENT DOCUMENTS 9,569,804 B2   2/2017   Stein et al.
9,961,571 B2   5/2018   Yang et al.
(Continued)

FOREIGN PATENT DOCUMENTS

CA       2951723 C  *  4/2021   ............... G06N 3/02
KR    20190058328 A     5/2019
WO    WO2017157171       9/2017

OTHER PUBLICATIONS

Shohet, Igal et al., "Application of key performance indicators for maintenance management of clinics facilities", International Journal of Strategic Property Management, Date: Jan. 2017, vol. 21 (1), Publisher: Research Gate, https://www.researchgate.net/publication/314070540_Application_of_key_performance_indicators_for_maintenance_management_of_clinics_facilities/link/5ebffb17299bflc09ac09ac0cbf1/download.
(Continued)

*Primary Examiner* — Michael J Dalbo
(74) *Attorney, Agent, or Firm* — Finnegan, Henderson, Farabow, Garrett & Dunner, LLP

(57) ABSTRACT
This disclosure relates generally to identification and analysis of regime shift. The identification and analysis of the regime shift includes regime shift identification (RSI), root cause analysis of the identified regime shift and a recommendation unit to rectify the identified regime shift. The disclosure proposes to monitor a system continuously to identify a regime shift at real-time as presence of regime shifts in any system decreases quality of process and products and makes the system less efficient. The regime shift is identified at real-time based on key performance indicators (KPIs), a set of relevant features and real time input data using machine learning techniques. Further the disclosure also proposes techniques for detecting at least one root cause for the identified regime shift and also recommends a
(Continued)

rectification action to rectify the identified regime shift based on optimization techniques.

7 Claims, 4 Drawing Sheets

(58) Field of Classification Search
CPC .. Y02P 90/30; G06F 11/3452; G06F 11/3466; G06F 2201/805
See application file for complete search history.

(56) References Cited

U.S. PATENT DOCUMENTS

| | | | |
|---|---|---|---|
| 10,031,510 B2 | 7/2018 | Zhao et al. | |
| 10,636,007 B2 | 4/2020 | Runkana et al. | |
| 10,742,486 B2 | 8/2020 | Mermoud et al. | |
| 2003/0004656 A1* | 1/2003 | Bjornson | G05B 23/0278 |
| | | | 702/34 |
| 2010/0162029 A1* | 6/2010 | Powell | G06Q 50/04 |
| | | | 714/E11.029 |
| 2014/0058572 A1 | 2/2014 | Stein et al. | |
| 2016/0155136 A1 | 6/2016 | Zhang et al. | |
| 2016/0320768 A1 | 11/2016 | Zhao et al. | |
| 2017/0032091 A1* | 2/2017 | Rudorfer | G16H 50/20 |
| 2017/0094537 A1 | 3/2017 | Yang et al. | |
| 2017/0200088 A1* | 7/2017 | Yang | H04W 24/04 |
| 2018/0107450 A1* | 4/2018 | Runkana | G06F 7/08 |
| 2018/0299849 A1* | 10/2018 | Martin | G05B 19/0426 |
| 2018/0330300 A1 | 11/2018 | Runkana et al. | |
| 2019/0188584 A1* | 6/2019 | Rao | G06Q 10/00 |
| 2019/0198405 A1* | 6/2019 | Li | G05B 19/41875 |
| 2019/0215230 A1 | 7/2019 | Mermoud et al. | |
| 2019/0334784 A1* | 10/2019 | Kvernvik | H04W 24/08 |
| 2020/0084087 A1* | 3/2020 | Sharma | H04W 24/08 |
| 2020/0322367 A1* | 10/2020 | Salvat Lozano | H04L 41/5009 |
| 2022/0084706 A1* | 3/2022 | Grossetete | G21C 7/06 |
| 2022/0365520 A1* | 11/2022 | Li | G06Q 10/0639 |

OTHER PUBLICATIONS

International Search Report and Written Opinion mailed Mar. 10, 2021, in International Application No. PCT/IN2020/050726; 8 pages.

* cited by examiner

100

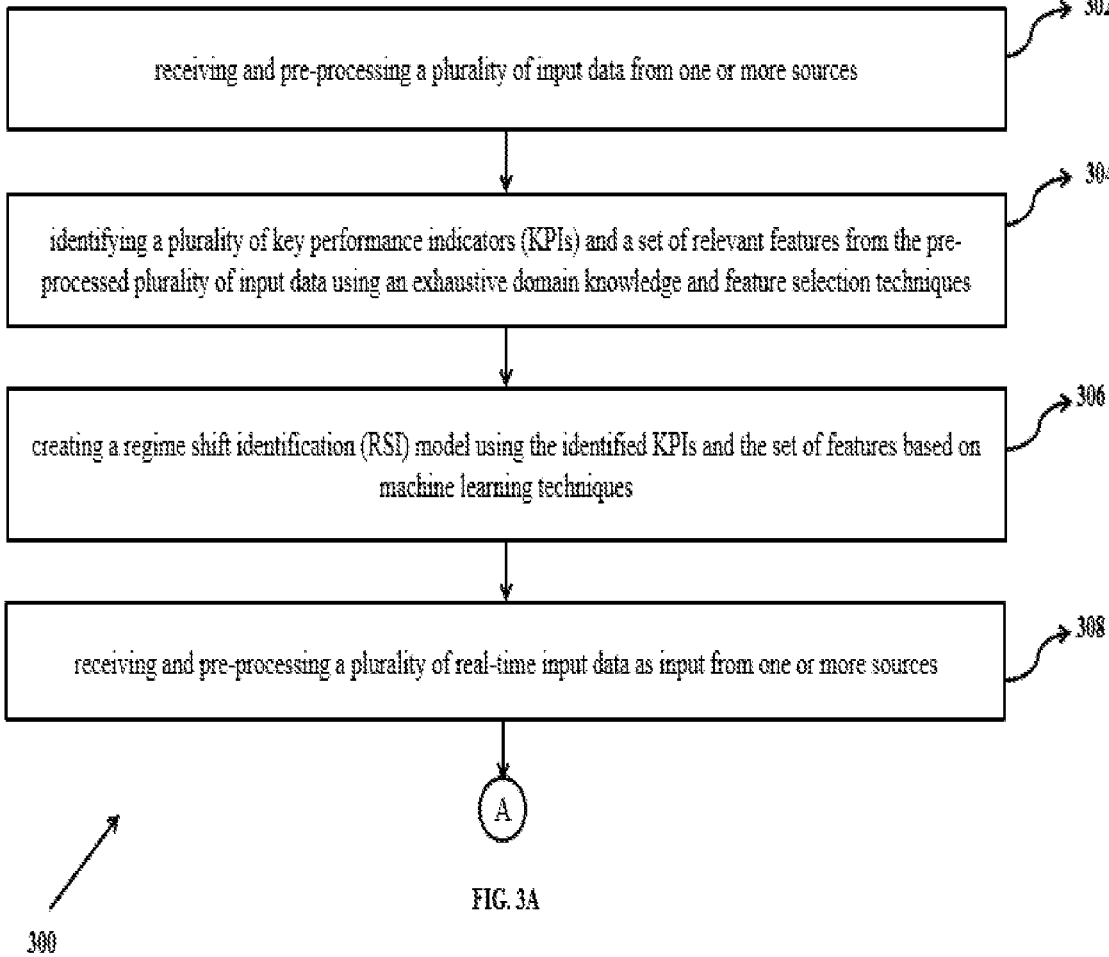

302 receiving and pre-processing a plurality of input data from one or more sources

304 identifying a plurality of key performance indicators (KPIs) and a set of relevant features from the pre-processed plurality of input data using an exhaustive domain knowledge and feature selection techniques

306 creating a regime shift identification (RSI) model using the identified KPIs and the set of features based on machine learning techniques

308 receiving and pre-processing a plurality of real-time input data as input from one or more sources

METHOD AND SYSTEM FOR IDENTIFICATION AND ANALYSIS OF REGIME SHIFT

CROSS-REFERENCE TO RELATED APPLICATIONS AND PRIORITY

The present application is a U.S. National stage Filing under 35 U.S.C. § 371 and claims priority from International Application No. PCT/IN2020/050745, filed on Aug. 25, 2020, which application claims priority from Indian Application No. 201921039286, filed on Sep. 27, 2019. The entire contents of the aforementioned applications are incorporated herein by reference.

TECHNICAL FIELD

The disclosure herein generally relates to field of regime shift analysis and, more particularly, to regime shift identification (RSI), root cause analysis of the identified regime shift and a recommendation unit to rectify the identified regime shift.

BACKGROUND

A regime is a characteristic behaviour of a system which is maintained by feedbacks or mutually reinforced processes. A change or a shift of any of the characteristic behaviour of the system causes a regime shift, wherein a regime shift usually occurs with at least one disturbance (external shocks) that triggers a completely different system behavior or by a smooth change in an internal process (feedback).

The systems in different industries/manufacturing units are designed to operate in desired range that gives maximum efficiency, however if the system starts operating outside the desired range and continues operating outside the desired range for long period it result in huge loss in terms of money, raw material and other resources. Further with increased number of sensors to monitor a system and complicated operating parameters, manual analysis of data for identifying a regime shift is time consuming and inefficient. Further simple statistical techniques for identifying a regime shift may also not be very effective considering the large data to be analyzed. Further few other existing techniques for identifying regime shift are effective on uni-variate data, however may not be very effective on multivariate data or on data that is received from a plurality of sources.

Hence monitoring a system and identifying a regime shift is important as regime shifts decreases quality of process and products and makes the system less efficient. In addition, a root cause analysis of the identified regime shift and a recommendation unit that improves the sensitivity and/or specificity of failure analysis would make the system more efficient.

SUMMARY

Embodiments of the present disclosure present technological improvements as solutions to one or more of the above-mentioned technical problems recognized by the inventors in conventional systems. For example, in one embodiment, a method and system for identification and analysis of regime shift is provided. The disclosure proposes to monitor a system continuously and identify a regime shift at real-time as presence of regime shifts in any system decreases quality of process and products and makes the system less efficient. The regime shift is identified at real-time based key performance indicators (KPIs), a set of relevant features and real time input data using machine learning techniques. Further the disclosure also proposes techniques for detecting at least one root cause for the identified regime shift and also recommends a rectification action to rectify the identified regime shift based on optimization techniques.

In another aspect, a method for identification and analysis of regime shift is provided. The method includes receiving and pre-processing a plurality of input data from one or more sources. The method further includes identifying a plurality of key performance indicators (KPIs) and a set of relevant features from the pre-processed plurality of input data using an exhaustive domain knowledge and feature selection techniques. The method further includes creating a regime shift identification (RSI) model using the identified KPIs and the identified set of features based on machine learning techniques. The method further includes receiving and pre-processing a plurality of real-time input data from one or more sources. The method further includes identifying the regime shift using the created RSI model and the plurality of real time input data. The method further includes detecting a plurality of root cause for the identified regime shift by identifying a responsible parameter and recommending a rectification action to rectify the identified regime shift.

In another aspect, a system for identification and analysis of regime shift is provided. The system comprises a memory storing instructions and a centralized database, one or more communication interfaces; and one or more hardware processors coupled to the memory via the one or more communication interfaces, wherein the one or more hardware processors are configured by instructions to include comprises an input module configured for receiving a plurality of input data and a plurality of real-time input data from one or more sources. The input module comprises of a pre-processing module that is configured for pre-processing the received plurality of input data and the plurality of real-time input data. The system further comprises of a domain knowledge database that is configured for sharing dynamically updated domain knowledge with the system. The system further includes a RSI model module that further comprise a KPI module, a feature selection module and a RSI model creation module, wherein the KPI module is configured for identifying a plurality of key performance indicators (KPI) from the pre-processed plurality of input data using an exhaustive domain knowledge, the feature selection module is configured for selecting a set of features for the identified plurality of KPIs based on feature selection techniques and domain knowledge; and the RSI model creation module configured for creating a model using the selected set of features using machine learning techniques. The system further comprises of a RSI module that is configured for identifying the regime shift using the created model and the plurality of real time input data. The system further comprises of a RCA module that is configured for detecting a plurality of root cause for the identified regime shift by identifying a responsible parameter. The system further comprises of a recommendation module that is configured for recommending a rectification action to rectify the identified regime shift and a display module configured for displaying the identified regime shift, the root cause and the rectification action.

In yet another aspect, a non-transitory computer readable medium for identification and analysis of regime shift is provided. The program includes receiving and pre-processing a plurality of input data from one or more sources. The program further includes identifying a plurality of key performance indicators (KPIs) and a set of relevant features from the pre-processed plurality of input data using an exhaustive domain knowledge and feature selection techniques. The program further includes creating a regime shift identification (RSI) model using the identified KPIs and the identified set of features based on machine learning techniques. The program further includes receiving and pre-processing a plurality of real-time input data from one or more sources. The program further includes identifying the regime shift using the created RSI model and the plurality of real time input data. The program further includes detecting a plurality of root cause for the identified regime shift by identifying a responsible parameter and recommending a rectification action to rectify the identified regime shift.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A and FIG. 3B is an exemplary flow diagram for identification and analysis of regime shift according to some embodiments of the present disclosure.

DETAILED DESCRIPTION OF EMBODIMENTS

Figure 1:
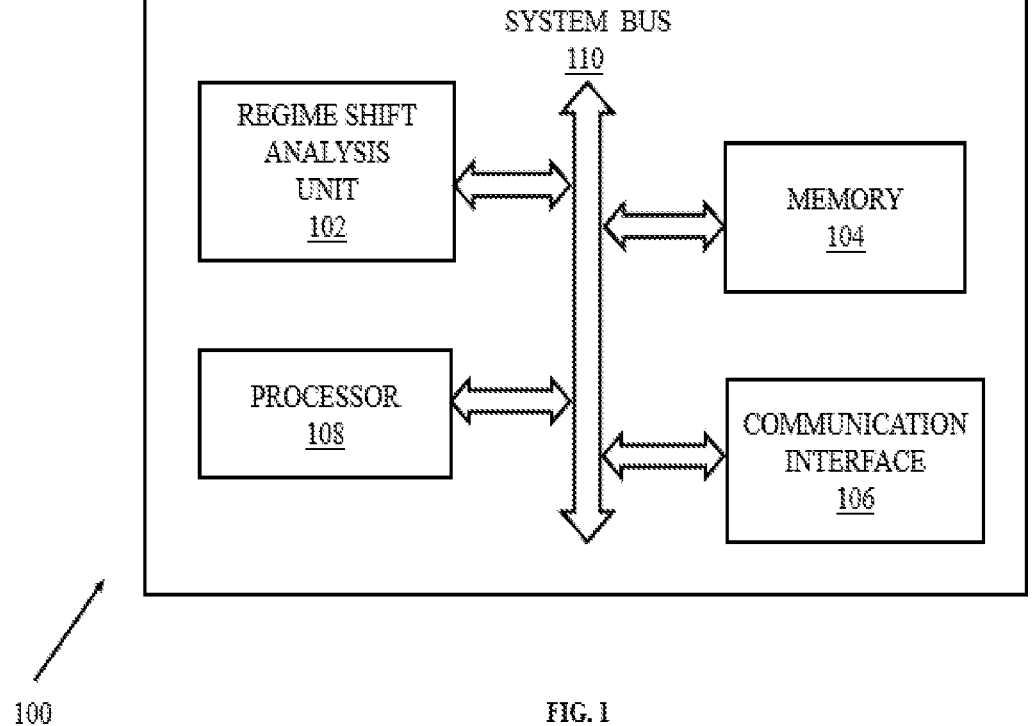
FIG. 1 illustrates an exemplary block diagram of a system for identification and analysis of regime shift in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The disclosure proposes to monitor a system continuously and identify a regime shift at real-time as presence of regime shifts in any system decreases quality of process and products and makes the system less efficient. The regime shift is identified at real-time based key performance indicators (KPIs), a set of relevant features and real time input data using machine learning techniques. Further the disclosure also proposes techniques for detecting at least one root cause for the identified regime shift and also recommends a rectification action to rectify the identified regime shift based on optimization techniques.

Key performance indicators (KPIs) is a quantifiable measure used to evaluate the success of a system/process/industrial plant/organization against meeting objectives for performance. For analysis purposes, KPI may be broadly categorized into measured KPI and derived KPI. The measured KPI is directly available in measurable form or whose data is directly collected through a sensor or other medium, while derived KPI cannot be directly measured and is derived from sub-KPI in a measurable form but used as representation metric for monitoring the platform/process.

Referring now to the drawings, and more particularly to FIG. 1 through FIG. 3A and FIG. 3B, where similar reference characters denote corresponding features consistently throughout the figures, there are shown preferred embodiments and these embodiments are described in the context of the following exemplary system and/or method.

FIG. 1 is a block diagram of a system 100 for identification and analysis of regime shift, in accordance with an example embodiment. The system 100 includes a regime shift analysis unit (102) for identification and root cause analysis of regime shift, wherein identification and analysis of the regime shift refers to regime shift identification (RSI), root cause analysis of the identified regime shift and a recommendation unit to rectify the identified regime shift. The regime shift analysis unit (102) includes or is otherwise in communication with a memory (104), a communication interface (106), and a processor (108). The memory 104, communication interface (106), and the processor (108) may be coupled by a system bus (110) or a similar mechanism. Although FIG. 1 shows example components of cloud migration estimation unit (102), in other implementations, system 100 may contain fewer components, additional components, different components, or differently arranged components than depicted in FIG. 1.

The processor (108) may be implemented as one or more microprocessors, microcomputers, microcontrollers, digital signal processors, central processing units, state machines, logic circuitries, and/or any devices that facilitates in designing polymeric carrier for controlled release of molecules. Further, the processor (108) may comprise a multi-core architecture. Among other capabilities, the processor (108) is configured to fetch and execute computer-readable instructions or modules stored in the memory (104). The processor (108) may include circuitry implementing, among others, audio and logic functions associated with the communication. For example, the processor (108) may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor (108) thus may also include the functionality to encode messages and/or data or information. The processor (108) may include, among other things, a clock, an arithmetic logic unit (ALU) and logic gates configured to support operation of the processor (108). Further, the processor (108) may include functionality to execute one or more software programs, which may be stored in the memory (104) or otherwise accessible to the processor (108).

The memory (104), may store any number of pieces of information, and data, used by the system (100) to implement the functions of the system (100). The memory (104) may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Examples of volatile memory may include, but are not limited to volatile random access memory (RAM). The non-volatile memory may additionally or alternatively comprise an electrically erasable programmable read only memory (EEPROM), flash memory, hard drive, or the like. The memory (104) may be configured to store information, data, applications, instructions or the like for enabling the system (100) to carry out various functions in accordance with various example embodiments. Additionally or alternatively, the memory (104) may be configured to store instructions which when executed by the processor (108) causes the system 100 to behave in a manner as described in various embodiments.

The communication interface(s) (106) can facilitate multiple communications within a wide variety of networks and protocol types, including wired networks, for example, local area network (LAN), cable, etc., and wireless networks, such as Wireless LAN (WLAN), cellular, or satellite. For the purpose, the communication interface (s) (106) may include one or more ports. One or more functionalities of the system 100 and components thereof, is further explained in detail with respect to block diagram described in FIG. 2.

Figure 2:
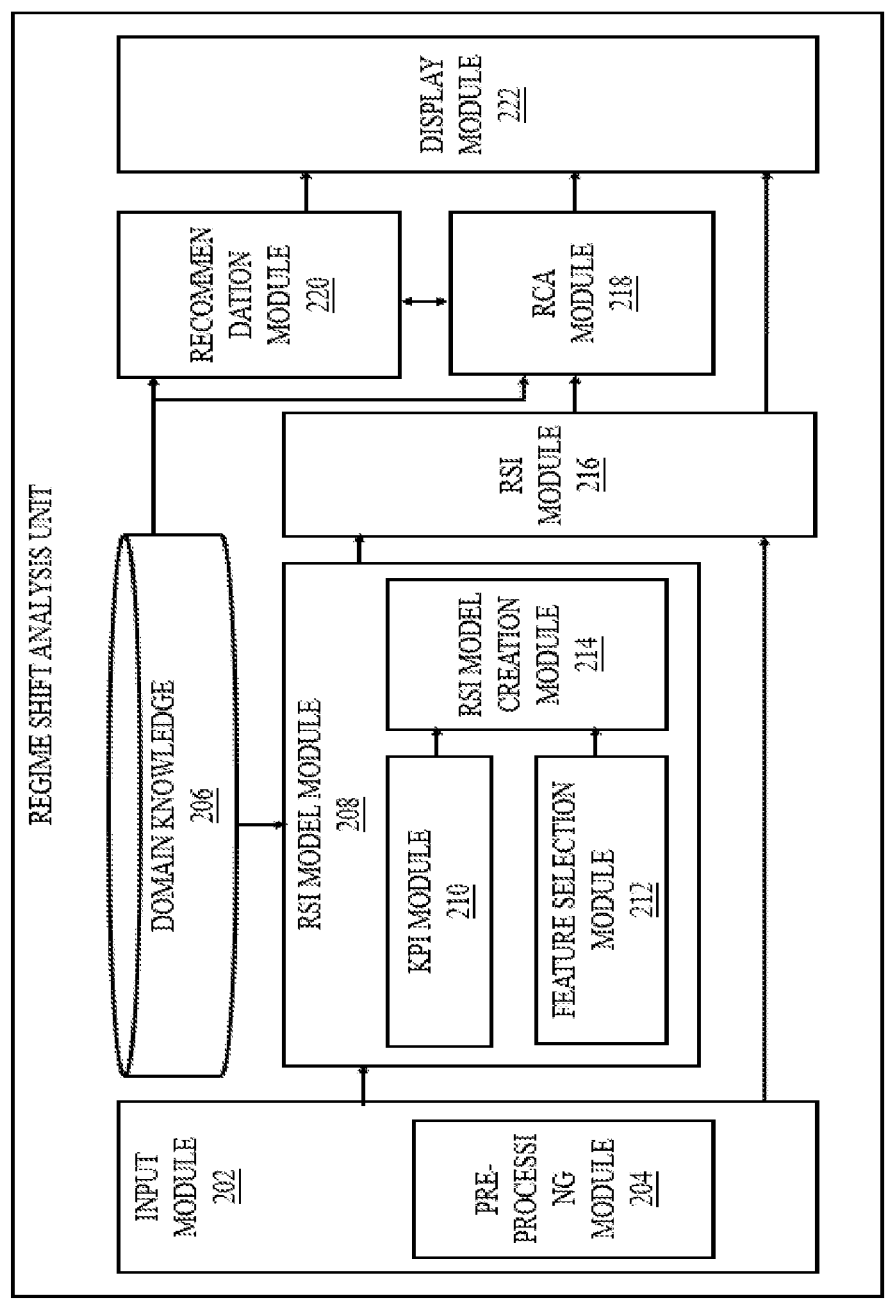
FIG. 2 is a functional block diagram of various modules stored in the system of FIG. 1 in accordance with some embodiments of the present disclosure.

FIG. 2, with reference to FIG. 1, is a block diagram of various modules of regime shift analysis unit (102) stored in the memory (104) of the system 100 of FIG. 1 in accordance with an embodiment of the present disclosure. In an embodiment of the present disclosure, the system (100) comprises an input module (202) configured for receiving a plurality of input data and a plurality of real-time input data from one or more sources. The input module (202) comprises of a pre-processing module (204) that is configured for pre-processing the received plurality of input data and the plurality of real-time input data. The system (100) further comprises of a domain knowledge database (206) that is configured for sharing dynamically updated domain knowledge with the system (100). The system (100) further includes a RSI model module (208) that further comprise a KPI module (210), a feature selection module (212) and a RSI model creation module (214), wherein the KPI module (210) is configured for identifying a plurality of key performance indicators (KPI) from the pre-processed plurality of input data using an exhaustive domain knowledge, the feature selection module (212) is configured for selecting a set of features for the identified plurality of KPIs based on feature selection techniques and domain knowledge; and the RSI model creation module (214) configured for creating a model using the selected set of features using machine learning techniques. The system (100) further comprises of a RSI module (216) that is configured for identifying the regime shift using the created model and the plurality of real time input data. The system (100) further comprises of a RCA module (218) that is configured for detecting a plurality of root cause for the identified regime shift by identifying a responsible parameter. The system (100) further comprises of a recommendation module (220) that is configured for recommending a rectification action to rectify the identified regime shift and a display module (222) configured for displaying the identified regime shift, the root cause and the rectification action, that are implemented as at least one of a logically self-contained part of a software program, a self-contained hardware component, and/or, a self-contained hardware component with a logically self-contained part of a software program embedded into each of the hardware component that when executed perform the above method described herein.

According to an embodiment of the disclosure, the system 100 comprises the input module (202) comprises of a pre-processing module (204) that is configured for pre-processing the received plurality of input data and the plurality of real-time input data. In an embodiment the source refers to any industry plant unit that has a plurality of operating units include Enterprise Resource Planning (ERP), Distributed Control System (DCS), Laboratory information management system (LIMS) which sends multivariate data as input that comprises a plurality of features such as raw material quality, composition & feed rate, process parameters, condition of equipment, environmental emission parameters, product quality and production amount.

According to an embodiment of the disclosure, the system 100 further comprises pre-processing module (204) that is configured for pre-processing the received plurality of input data and the plurality of real-time input data. In an embodiment step of pre-processing includes removing outliers and replacing missing input data based on multi-level outlier model and clustering classification respectively.

In one embodiment, the pre-processing includes performing iterations for pre-processing input data associated with a manufacturing process. Each iteration comprises removing outliers from the input data using a multi-level outlier model to obtain a filtered data. The filtered data is categorized into multiple categories to identify missing data based on a frequency of occurrence of various parameters. Missing data is selectively imputed based on the multiple categories to obtain imputed data which is clustered into various data clusters based on a predefined criteria. After every iteration, it is determined whether the imputed data associated with a current iteration is clustered into the same data clusters as associated with a previous iteration. Various iterations are performed until the data clusters in the previous iteration and the current iterations are similar to finally result in pre-processed input data.

According to an embodiment of the disclosure, the system 100 further comprises domain knowledge database (206) that is configured for sharing dynamically updated domain knowledge with the system (100). The domain knowledge database (206) is dynamically updated with exhaustive domain knowledge of a variety of sources that include Enterprise Resource Planning (ERP), Distributed Control System (DCS), Laboratory information management system (LIMS) which sends multivariate data that comprises raw material quality, composition & feed rate, process parameters, condition of equipment, environmental emission parameters, product quality and production amount.

According to an embodiment of the disclosure, the system 100 further comprises the RSI model module (208). The RSI model module (208) further comprise the KPI module (210), the feature selection module (212) and the RSI model creation module (214). The KPI module (210) is configured for identifying a plurality of key performance indicators (KPI) from the pre-processed plurality of input data using an exhaustive domain knowledge. The feature selection module (212) is configured for selecting a set of features from the identified plurality of KPIs based on feature selection techniques and domain knowledge and the RSI model creation module (214) configured for creating a model using the selected set of features using machine learning techniques.

In an embodiment, the plurality of KPIs identified from the pre-processed input data in the KPI module (210). The plurality of KPIs identified include measured KPIs and derived KPI, wherein the measured KPI and derived KPI is identified based on domain knowledge received from the domain knowledge database (206).

In an embodiment the feature selection to select a set of relevant features from the pre-processed plurality of input data is performed in the feature selection module (212). The feature selection is implemented based on a plurality of techniques that include correlation techniques, statistics and machine learning techniques followed by ranking and consolidation.

In an embodiment, the correlation techniques are implemented in several steps that includes calculating a correlation co-efficient and ranking the relevant features based on calculated correlation value, wherein higher the correlation value higher is the importance of feature. The correlation technique may be expressed as shown below;

$$r_{xy} = \frac{\sum (x_i - \bar{x})(y_i - \bar{y})}{\sqrt{\sum (x_i - \bar{x})^2 \sum (y_i - \bar{y})^2}}$$

where
$r_{xy}$ is correlation co-efficient,
wherein $x_i$ is a feature and $y_i$ is a KPI at any time interval t In an embodiment, the machine learning techniques such as stepwise regression, least absolute shrinkage and selection operator (LASSO), random forest and Support Vector Machine (SVM) are implemented in several steps that comprises of building a model and further ranking features based on built models. The step of ranking a feature based on correlation of model wherein higher a compute co-efficient, higher the importance, the rank of feature j is consolidated based on a dynamic average ranking parameter computed based on a rank and a frequency of a feature j, which can be expressed as shown below;

$$score_j = \frac{\sum_k r_{j,k}}{f_j}$$

Where $r_{j,k}$ is rank of feature j using machine learning technique k, and $f_j$ is frequency of a feature to be selected amongst k techniques.

In an embodiment, creating a regime shift identification (RSI) model is created in the RSI model creation module (214) using identified set of relevant features based on machine learning techniques for the identified KPIs According to an embodiment of the disclosure, the system 100 further comprises the RSI module (216) that is configured for identifying the regime shift using the created model and the plurality of real time input data based on domain knowledge. The regime shift is identified using on a statistical or a machine learning technique based on the nature of source determined by domain knowledge, wherein the statistical techniques include hypothesis techniques and the machine learning techniques include auto encoder techniques.

In an embodiment, regime shift is identified based on statistical techniques that include hypothesis techniques in several steps. The steps for identifying regime shift based on hypothesis technique include identifying full historic data/window of data and short series of regime shift length based on domain knowledge. Further a hypothesis test is performed between the identified historic data and the short series of regime shift length to identify the regime shift.

In another embodiment, the regime shift is identified based on machine learning techniques, wherein neural network based auto-encoder model is utilized for identifying the regime shift. The threshold for a KPI and other parameter is dynamically defined out based on a reconstruction error of auto-encoder, which is expressed as shown below;

reconstruction error=Actual observed data−reconstructed data by model

Further a threshold is computed, which is expressed as shown below;

threshold=mean of error±standard deviation of error

Further based on the threshold computed, regime shift is identified based on comparison of real time data input with computed threshold.

According to an embodiment of the disclosure, the system 100 further comprises the RCA module (218) that is configured for detecting a plurality of root cause for the identified regime shift by identifying a responsible parameter.

In an embodiment, the responsible parameter include a plurality of manipulated responsible parameter and a plurality of process parameters which are identified at real-time based on the model using a variety of techniques that are used to identify the regime shift, which include reconstruction error and mean hypothesis techniques. In an embodiment, the responsible parameter is identified while performing the reconstruction error and mean hypothesis techniques, wherein the KPI that is active during identification of RSI is identified as the responsible parameter, wherein active refers to the KPI that is shifting its regime beyond the threshold.

The root cause analysis (RCA) is performed individually for measured KPI and derived KPI, wherein RCA for measured KPI is identified based on identification of the responsible parameter and the derived KPI is identified based on the responsible parameter and a RCA consolidation techniques. The RCA consolidation techniques for identifying RCA in derived KPI includes assigning weightage and ranking based on the plurality of domain knowledge received from the domain knowledge database (206).

In an embodiment, the consolidation techniques for identifying RCA in derived KPI includes assigning weightage and ranking based on the plurality of domain knowledge received from the domain knowledge database (206). The process of assigning weight includes assigning a pre-defined weightage to each KPI and further ranking the responsible parameter based on a weighted score, which can be expressed as;

$$WS_j = \frac{\sum_i W_i S_{ji}}{\sum_i S_{ji}}$$

Where
$WS_j$ is the weighted score
$W_i$ is the weightage of $i^{th}$ KPI and
$S_{ji}$ is the importance score of responsible parameter j in KPI i.

Considering an use case example of two KPI s represented as KPI1 and KPI2, wherein for KPI1 weightage is W1, responsible parameter are P1 and P2 with score S11 and S21 and for KPI2 weightage is W2, responsible feature are P1 and P2 with Score S21 and S22, then the weighted score is computed using the above expression and at least one responsible parameter is identified among computed weighted scores, wherein lower weighted scores are preferred.

According to an embodiment of the disclosure, the system 100 further comprises the recommendation module (220)

that is configured for recommending a rectification action to rectify the identified regime shift.

In an embodiment, the rectification action to rectify the identified regime shift includes optimization techniques or a pre-defined rule engine based technique. The rectification action based on optimization is performed by dynamically defining an objective function and a constraint function based on domain knowledge and the identified RCA.

In an embodiment, the rectification action to rectify the identified regime shift is performed based on a pre-defined rule engine in several steps that include computing mean value of identified responsible parameter, further generating a ideal value based on domain knowledge and computed mean value to change the value of responsible parameter based on ideal value to mitigate the identified regime shift as recommendation action.

In an embodiment, the rectification action to rectify the identified regime shift is performed based on optimization, wherein the optimization is performed based on dynamically defining an objective function and a constraint function based on domain knowledge and the identified RCA. The objective function is defined based on the identified KPI, which can be expressed as shown below;

$$O = (KPI - KPI')^2$$

where

O is the objective function and

KPI is the key performance indicators

KPI' is the base value of key performance indicators.

Further the constraint function is defined based on a pre-defined upper and lower bound of the manipulated responsible parameters and process responsible parameters to maintain a pre-defined operating point, which is expressed as follows;

$$Cm_{nL} < Cm_n < Cm_{nU}$$

where $Cm_{nL}$ is the lower bound of the manipulated responsible parameter $Cm_n$ is the constraint function $Cm_{nU}$ is the upper bound of the manipulated responsible parameter $$Cp_{nL} < Cp_n < Cp_{nU}$$

where $Cp_{nL}$ is the lower bound of the process responsible parameter $Cp_n$ is the constraint function $Cp_{nU}$ is the upper bound of the process responsible parameter The defined objective function and constraint function is optimized based on identified RSI and RCA to recommend a rectification action.

According to an embodiment of the disclosure, the system 100 further comprises the display module (222) configured for displaying the identified regime shift, the root cause and the rectification action.

Figure 3B:
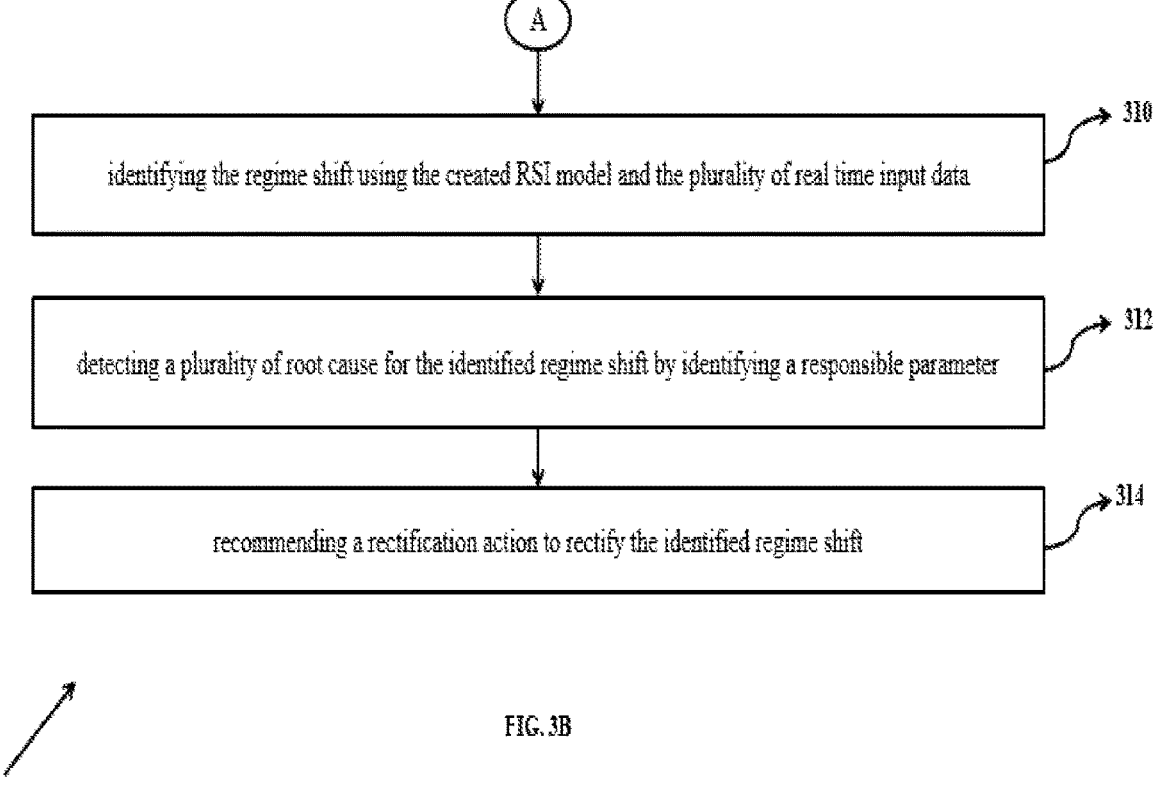

FIG. 3A and FIG. 3B, with reference to FIGS. 1-2, is an exemplary flow diagram illustrating a method for identification and analysis of regime shift using the system 100 of FIG. 1 according to an embodiment of the present disclosure. In an embodiment, the system 100 comprises one or more data storage devices or the memory 104 operatively coupled to the one or more hardware processors 108 and is configured to store instructions for execution of steps of the method by the one or more processors 108. The steps of the method of the present disclosure will now be explained with reference to the components of the system 100 and the modules (202-222) as depicted in FIGS. 1-2, and the flow diagram as depicted in FIG. 3A and FIG. 3B.

At step 302, includes receiving and pre-processing a plurality of input data from one or more sources by the input module (202). The plurality of input data received by the input module (202) is pre-processed at the pre-processing module (204). In an embodiment the source refers to any industry plant unit that has a plurality of operating units include Enterprise Resource Planning (ERP), Distributed Control System (DCS), Laboratory information management system (LIMS) which sends multivariate data as input that comprises raw material quality, composition & feed rate, process parameters, condition of equipment, environmental emission parameters, product quality and production amount.

In the next step at 304, includes identifying a plurality of key performance indicators (KPIs) and a set of relevant features from the pre-processed plurality of input data at the KPI module (210) and the feature selection module (212) of the RSI model module (208). The plurality of KPIs identified from the pre-processed input data in the KPI module (210) include measured KPIs and derived KPI, wherein the measured KPI and derived KPI is identified based on domain knowledge received from the domain knowledge database (206). Further the feature selection to select a set of relevant features from the pre-processed plurality of input data the in the feature selection module (212) is performed based on a plurality of techniques that include correlation techniques, statistics and machine learning techniques followed by ranking and consolidation.

In the next step at 306, includes creating a regime shift identification (RSI) model in the RSI model creation module (214). The RSI model is created using the identified KPIs and the identified set of features based on machine learning techniques.

In the next step at 308, includes receiving and pre-processing a plurality of real-time input data from one or more sources by the input module (202). The plurality of real-time input data received by the input module (202) is pre-processed at the pre-processing module (204). In an embodiment the source refers to any industry plant unit that has a plurality of operating units include Enterprise Resource Planning (ERP), Distributed Control System (DCS), Laboratory information management system (LIMS) which sends multivariate data as input that comprises raw material quality, composition & feed rate, process parameters, condition of equipment, environmental emission parameters, product quality and production amount.

In the next step at 310, includes identifying the regime shift using the created RSI model and the plurality of real time input data in the RSI module (216). The regime shift is identified based on a statistical or a machine learning technique, wherein the statistical techniques include hypothesis techniques and the machine learning techniques include auto encoder techniques.

In the next step at 312, includes detecting a plurality of root cause for the identified regime shift by identifying a responsible parameter in the RCA module (218). The responsible parameter is identified based on the model using a variety of techniques that include reconstruction error and mean hypothesis techniques. The root cause analysis (RCA) is performed individually for measured KPI and derived KPI, wherein RCA for measured KPI is identified based on identification of the responsible parameter and the derived KPI is identified based on the responsible parameter and a RCA consolidation techniques. The RCA consolidation techniques for identifying RCA in derived KPI includes assigning weightage and ranking based on the plurality of domain knowledge.

In the next step at 314, includes recommending a rectification action to rectify the identified regime shift by the recommendation module (220). The rectification action to rectify the identified regime shift includes optimization techniques or a pre-defined rule engine based technique. The rectification action based on optimization is performed by dynamically defining an objective function and a constraint function based on domain knowledge and the identified RCA.

The identified regime shift, the root cause and the rectification action is displayed on the display module (222).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Hence a method and a system for identification and analysis of the regime shift is provided. The identification and analysis of the regime shift includes regime shift identification (RSI), root cause analysis of the identified regime shift and a recommendation unit to rectify the identified regime shift. The disclosure proposes to monitor a system continuously and identify a regime shift at real-time as presence of regime shifts in any system decreases quality of process and products and makes the system less efficient. The regime shift is identified at real-time based key performance indicators (KPIs), a set of relevant features and real time input data using machine learning techniques. Further the disclosure also proposes techniques for detecting at least one root cause for the identified regime shift and also recommends a rectification action to rectify the identified regime shift based on optimization techniques.

It is to be understood that the scope of the protection is extended to such a program and in addition to a computer-readable means having a message there in; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

The invention claimed is:

1. A processor-implemented method for identification and analysis of a regime shift, the method comprising:

receiving and pre-processing a plurality of input data, associated with an industrial plant, from one or more sources, wherein the one or more sources refers to an industry plant unit, wherein the step of pre-processing includes performing iterations for pre-processing the plurality of input data associated with the industrial plant, wherein each iteration comprises removing outliers from the input data using a multi-level outlier model to obtain a filtered data and the filtered data is categorized into multiple categories to identify missing data based on a frequency of occurrence of a plurality of parameters, wherein the missing data is imputed based on the multiple categories to obtain imputed data which is clustered into plurality of data clusters based on a predefined criteria, wherein after every iteration, determining whether the imputed data associated with a current iteration is clustered into the same data clusters as associated with a previous iteration and a plurality of iterations are performed until the data clusters in the previous iteration and the current iteration are similar to obtain a pre-processed plurality of input data;

identifying a plurality of key performance indicators (KPIs) and a set of relevant features from the pre-processed plurality of input data using an exhaustive domain knowledge and feature selection techniques, wherein the feature selection techniques include correlation techniques, statistics and machine learning techniques followed by ranking and consolidation, wherein the correlation techniques are performed by calculating a correlation co-efficient and ranking the set of relevant features based on a calculated correlation value, wherein the correlation technique is expressed as:

$$r_{xy} = \frac{\sum (x_i - \bar{x})(y_i - \bar{y})}{\sqrt{\sum (x_i - \bar{x})^2 \sum (y_i - \bar{y})^2}}$$

where $r_{xy}$ is the correlation co-efficient, wherein $x_i$ is a feature and $y_i$ is a KPI at a time interval t, wherein the machine learning techniques are performed by building a model and ranking features based on the built model, wherein ranking the feature based on a correlation of the model and a rank of the feature is consolidated based on a dynamic average ranking parameter computed based on the rank and a frequency of the feature, which is expressed as:

$$score_j = \frac{\sum_k r_{j,k}}{f_j}$$

where $r_{j,k}$ is the rank of the feature j using the machine learning technique k, and $f_j$ is the frequency of the feature to be selected amongst k machine learning techniques;

creating a regime shift identification (RSI) model using the identified KPIs and the identified set of features based on machine learning techniques;

receiving and pre-processing a plurality of real-time input data from one or more sources;

continuously monitoring the industrial plant for identifying the regime shift at real-time using the created RSI model and the plurality of real time input data based on a domain knowledge, wherein the regime shift is identified based on a statistical or a machine learning technique based on a nature of a source determined by the domain knowledge, wherein the statistical techniques include hypothesis techniques and the machine learning techniques include auto encoder techniques, wherein steps for identifying regime shift based on hypothesis technique include identifying full historic data or window of data and short series of regime shift length based on the exhaustive domain knowledge, wherein a hypothesis test is performed between the identified historic data and the short series of regime shift length to identify the regime shift, wherein a responsible parameter is identified at real-time based on the model using techniques including reconstruction error and mean hypothesis techniques, wherein the responsible parameter is identified while performing the reconstruction error and mean hypothesis techniques, wherein the KPI that is active during identification of RSI is identified as the responsible parameter, wherein active refers to the KPI that is shifting respective regime beyond the threshold computed with a mean and a standard deviation of the reconstruction error, wherein the threshold for the KPI and the responsible parameter is dynamically defined based on the reconstruction error of an auto-encoder, wherein the regime shift is identified based on a comparison of the real-time input data with the threshold;

detecting a plurality of root cause for the identified regime shift using the identified responsible parameter; and performing a rectification action to rectify the identified regime shift, by performing optimization techniques or a pre-defined rule engine based technique, the optimization technique is performed by dynamically defining an objective function and a constraint function based on the domain knowledge and identified root cause analysis (RCA), or the pre-defined rule engine based technique is performed by computing a mean value of the identified responsible parameter, and generating an ideal value based on the domain knowledge and the computed mean value to change a value of the responsible parameter based on the ideal value to mitigate the identified regime shift as the rectification action, wherein the root cause analysis (RCA) is performed individually for measured KPI and derived KPI, wherein the RCA for the measured KPI is identified based on identification of the responsible parameter and the derived KPI is identified based on the responsible parameter and RCA consolidation techniques, wherein the objective function is defined based on the identified KPI, which is expressed as:

O=(KPI–KPI') where O is the objective function and KPI is the key performance indicators, KPI' is the base value of key performance indicators, wherein the constraint function is defined based on a pre-defined upper bound and lower bound of manipulated responsible parameters and process responsible parameters to maintain a pre-defined operating point, which is expressed as follows:

$$Cm_{nL} < Cm_n < Cm_{nU}$$

where $Cm_{nL}$ is the lower bound of the manipulated responsible parameter, $Cm_n$ is the constraint function, $Cm_{nU}$ is the upper bound of the manipulated responsible parameter, $$Cp_{nL} < Cp_n < Cp_{nU}$$

where $Cp_{nL}$ is the lower bound of the process responsible parameter, $Cp_n$ is the constraint function, $Cp_{nU}$ is the upper bound of the process responsible parameter;

dynamically updating a domain knowledge database with the exhaustive domain knowledge of the one or more sources including the industry plant unit comprising a plurality of operating units including Enterprise Resource Planning (ERP), Distributed Control System (DCS), Laboratory information management system (LIMS) which sends multivariate data that comprises raw material quality, composition and feed rate, process parameters, condition of equipment, environmental emission parameters, product quality and production amount, wherein the domain knowledge is received from the domain knowledge database, and wherein the domain knowledge database configured for sharing the dynamically updated domain knowledge with a system.

2. The method of claim 1, wherein identification and analysis of the regime shift includes regime shift identification (RSI), root cause analysis of the identified regime shift and rectifies the identified regime shift.

3. The method of claim 1, wherein the identified regime shift, the root cause and the rectification action is displayed on a display module.

4. The method of claim 1, the plurality of KPIs identified from the pre-processed input data include measured KPIs and derived KPI, wherein the measured KPI and derived KPI is identified based on the domain knowledge received from the domain knowledge database.

5. The method of claim 1, wherein the RCA consolidation techniques for identifying RCA in derived KPI includes assigning weightage and ranking based on the plurality of domain knowledge, wherein assigning the weightage includes assigning a pre-defined weightage to each KPI and ranking the responsible parameter based on a weighted score, represented as:

$$WS_j = \frac{\sum_i w_i s_{ji}}{\sum_i s_{ji}}$$

where
$WS_j$ is the weighted score
$W_i$ is the weightage of $i^{th}$ KPI and
$S_{ji}$ is an importance score of the responsible parameter j in KPI i.

6. A system for identification and RCA of a regime shift comprising:

a memory for storing instructions;

one or more communication interfaces;

one or more hardware processors communicatively coupled to the memory using the one or more communication interfaces, wherein the one or more hardware processors are configured by the instructions for identification and root cause analysis of a regime shift, the system is configured for:

receiving a plurality of input data and a plurality of real-time input data, associated with an industrial plant, from one or more sources, wherein the one or more sources refers to an industry plant unit;

pre-processing the received plurality of input data and the plurality of real-time input data, wherein the pre-processing includes performing iterations for pre-processing the plurality of input data associated with the industrial plant, wherein each iteration comprises removing outliers from the input data using a multi-level outlier model to obtain a filtered data and the filtered data is categorized into multiple categories to identify missing data based on a frequency of occurrence of a plurality of parameters, wherein the missing data is imputed based on the multiple categories to obtain imputed data which is clustered into plurality of data clusters based on a predefined criteria, wherein after every iteration, determining whether the imputed data associated with a current iteration is clustered into the same data clusters as associated with a previous iteration and a plurality of iterations are performed until the data clusters in the previous iteration and the current iteration are similar to obtain a pre-processed plurality of input data;

a domain knowledge database configured for sharing dynamically updated domain knowledge with the system, wherein the domain knowledge database is dynamically updated with the exhaustive domain knowledge of the one or more sources including the industry plant unit comprising a plurality of operating units including Enterprise Resource Planning (ERP), Distributed Control System (DCS), Laboratory information management system (LIMS) which sends multivariate data that comprises raw material quality, composition and feed rate, process parameters, condition of equipment, environmental emission parameters, product quality and production amount, wherein the domain knowledge is received from the domain knowledge database;

continuously monitoring the industrial plant for identifying a plurality of key performance indicators (KPI) from the pre-processed plurality of input data using an exhaustive domain knowledge;

selecting a set of features from the identified plurality of KPIs based on feature selection techniques and domain knowledge, wherein the feature selection techniques include correlation techniques, statistics and machine learning techniques followed by ranking and consolidation, wherein the correlation techniques are performed by calculating a correlation co-efficient and ranking the set of relevant features based on a calculated correlation value, wherein the correlation technique is expressed as:

$$r_{xy} = \frac{\sum (x_i - \bar{x})(y_i - \bar{y})}{\sqrt{\sum (x_i - \bar{x})^2 \sum (y_i - \bar{y})^2}}$$

where
$r_{xy}$ is the correlation co-efficient,
wherein $x_i$ is a feature and $y_i$ is a KPI at a time interval t,
wherein the machine learning techniques are performed by building a model and ranking features based on the built model, wherein ranking the feature based on a correlation of the model and a rank of the feature is consolidated based on a dynamic average ranking parameter computed based on the rank and a frequency of the feature, which is expressed as:

$$score_j = \frac{\sum_k r_{j,k}}{f_j}$$

where $r_{j,k}$ is the rank of the feature j using the machine learning technique k, and $f_j$ is the frequency of the feature to be selected amongst k machine learning techniques; and creating a model using the selected set of features using machine learning techniques;

identifying the regime shift at real-time using the created model and the plurality of real time input data based on a domain knowledge, wherein the regime shift is identified based on a statistical or a machine learning technique based on a nature of a source determined by the domain knowledge, wherein the statistical techniques include hypothesis techniques and the machine learning techniques include auto encoder techniques, wherein steps for identifying regime shift based on hypothesis technique include identifying full historic data or window of data and short series of regime shift length based on the exhaustive domain knowledge, wherein a hypothesis test is performed between the identified historic data and the short series of regime shift length to identify the regime shift, wherein a responsible parameter is identified at real-time based on the model using techniques including reconstruction error and mean hypothesis techniques, wherein the responsible parameter is identified while performing the reconstruction error and mean hypothesis techniques, wherein the KPI that is active during identification of RSI is identified as the responsible parameter, wherein active refers to the KPI that is shifting respective regime beyond the threshold computed with a mean and a standard deviation of the reconstruction error, wherein the threshold for the KPI and the responsible parameter is dynamically defined based on the reconstruction error of an auto-encoder, wherein the regime shift is identified based on a comparison of the real-time input data with the threshold;

detecting a plurality of root cause for the identified regime shift using the identified responsible parameter; and performing a rectification action to rectify the identified regime shift by performing optimization techniques or a pre-defined rule engine based technique, the optimization technique is performed by dynamically defining an objective function and a constraint function based on the domain knowledge and identified root cause analysis (RCA), or the pre-defined rule engine based technique is performed by computing a mean value of the identified responsible parameter, and generating an ideal value based on the domain knowledge and the computed mean value to change a value of the responsible parameter based on the ideal value to mitigate the identified regime shift as the rectification action, wherein the root cause analysis (RCA) is performed individually for measured KPI and derived KPI, wherein the RCA for the measured KPI is identified based on identification of the responsible parameter and the derived KPI is identified based on the responsible parameter and RCA consolidation techniques, wherein the objective function is defined based on the identified KPI, which is expressed as:

O=(KPI–KPI') where O is the objective function and KPI is the key performance indicators, KPI' is the base value of key performance indicators, wherein the constraint function is defined based on a pre-defined upper bound and lower bound of manipulated responsible parameters and process responsible parameters to maintain a pre-defined operating point, which is expressed as follows:

$$Cm_{nL} < Cm_n < Cm_{nU}$$

where $Cm_{nL}$ is the lower bound of the manipulated responsible parameter, $Cm_n$ is the constraint function, $Cm_{nU}$ is the upper bound of the manipulated responsible parameter, $$Cp_{nL} < Cp_n < Cp_{nU}$$

where $Cp_{nL}$ is the lower bound of the process responsible parameter, $Cp_n$ is the constraint function, $Cp_{nU}$ is the upper bound of the process responsible parameter; and a display module configured for displaying the identified regime shift, the root cause and the rectification action.

7. A non-transitory computer-readable medium having embodied thereon a computer readable program for identification and root cause analysis of a regime shift wherein the computer readable program, when executed by one or more hardware processors, cause:

receiving and pre-processing a plurality of input data, associated with an industrial plant, from one or more sources, wherein the one or more sources refers to an industry plant unit, wherein the step of pre-processing includes performing iterations for pre-processing the plurality of input data associated with the industrial plant, wherein each iteration comprises removing outliers from the input data using a multi-level outlier model to obtain a filtered data and the filtered data is categorized into multiple categories to identify missing data based on a frequency of occurrence of a plurality of parameters, wherein the missing data is imputed based on the multiple categories to obtain imputed data which is clustered into plurality of data clusters based on a predefined criteria, wherein after every iteration, determining whether the imputed data associated with a current iteration is clustered into the same data clusters as associated with a previous iteration and a plurality of iterations are performed until the data clusters in the previous iteration and the current iteration are similar to obtain a pre-processed plurality of input data;

identifying a plurality of key performance indicators (KPIs) and a set of relevant features from the pre-processed plurality of input data using an exhaustive domain knowledge and feature selection techniques, wherein the feature selection techniques include correlation techniques, statistics and machine learning techniques followed by ranking and consolidation, wherein the correlation techniques are performed by calculating a correlation co-efficient and ranking the set of relevant features based on a calculated correlation value, wherein the correlation technique is expressed as:

$$r_{xy} = \frac{\sum (x_i - \bar{x})(y_i - \bar{y})}{\sqrt{\sum (x_i - \bar{x})^2 \sum (y_i - \bar{y})^2}}$$

where $r_{xy}$ is the correlation co-efficient, wherein $x_i$ is a feature and $y_i$ is a KPI at a time interval t, wherein the machine learning techniques are performed by building a model and ranking features based on the built model, wherein ranking the feature based on a correlation of the model and a rank of the feature is consolidated based on a dynamic average ranking parameter computed based on the rank and a frequency of the feature, which is expressed as:

$$score_j = \frac{\sum_k r_{j,k}}{f_j}$$

where $r_{j,k}$ is the rank of the feature j using the machine learning technique k, and $f_j$ is the frequency of the feature to be selected amongst k machine learning techniques;

creating a regime shift identification (RSI) model using the identified KPIs and the identified set of features based on machine learning techniques;

receiving and pre-processing a plurality of real-time input data from one or more sources;

continuously monitoring the industrial plant for identifying the regime shift at real-time using the created RSI model and the plurality of real time input data based on a domain knowledge, wherein the regime shift is identified based on a statistical or a machine learning technique based on a nature of a source determined by the domain knowledge, wherein the statistical techniques include hypothesis techniques and the machine learning techniques include auto encoder techniques, wherein steps for identifying regime shift based on hypothesis technique include identifying full historic data or window of data and short series of regime shift length based on the exhaustive domain knowledge, wherein a hypothesis test is performed between the identified historic data and the short series of regime shift length to identify the regime shift, wherein a responsible parameter is identified at real-time based on the model using a variety of techniques that include reconstruction error and mean hypothesis techniques, wherein the responsible parameter is identified while performing the reconstruction error and mean hypothesis techniques, wherein the KPI that is active during identification of RSI is identified as the responsible parameter, wherein active refers to the KPI that is shifting its regime beyond the threshold computed with mean and standard deviation of the reconstruction error, wherein the threshold for the KPI and the responsible parameter is dynamically defined based on the reconstruction error of an auto-encoder, wherein the regime shift is identified based on a comparison of the real-time input data with the threshold;

detecting a plurality of root cause for the identified regime shift using the identified responsible parameter; and performing a rectification action to rectify the identified regime shift by performing optimization techniques or a pre-defined rule engine based technique, the optimization technique is performed by dynamically defining an objective function and a constraint function based on the domain knowledge and identified root cause analysis (RCA), or the pre-defined rule engine based technique is performed by computing a mean value of the identified responsible parameter, and generating an ideal value based on the domain knowledge and the computed mean value to change a value of the responsible parameter based on the ideal value to mitigate the identified regime shift as the rectification action, wherein the root cause analysis (RCA) is performed individually for measured KPI and derived KPI, wherein the RCA for the measured KPI is identified based on identification of the responsible parameter and the derived KPI is identified based on the responsible parameter and RCA consolidation techniques, wherein the objective function is defined based on the identified KPI, which is expressed as:

O=(KPI−KPI') where O is the objective function and KPI is the key performance indicators, KPI' is the base value of key performance indicators, wherein the constraint function is defined based on a pre-defined upper bound and lower bound of manipulated responsible parameters and process responsible parameters to maintain a pre-defined operating point, which is expressed as follows:

$$Cm_{nL} < Cm_n < Cm_{nU}$$

where $Cm_{nL}$ is the lower bound of the manipulated responsible parameter, $Cm_n$ is the constraint function, $Cm_{nU}$ is the upper bound of the manipulated responsible parameter, $$Cp_{nL} < Cp_n < Cp_{nU}$$

where $Cp_{nL}$ is the lower bound of the process responsible parameter, $Cp_n$ is the constraint function, $Cp_{nU}$ is the upper bound of the process responsible parameter;

dynamically updating a domain knowledge database with the exhaustive domain knowledge of the one or more sources including the industry plant unit comprising a plurality of operating units including Enterprise Resource Planning (ERP), Distributed Control System (DCS), Laboratory information management system (LIMS) which sends multivariate data that comprises raw material quality, composition and feed rate, process parameters, condition of equipment, environmental emission parameters, product quality and production amount, wherein the domain knowledge is received from the domain knowledge database, and wherein the domain knowledge database configured for sharing the dynamically updated domain knowledge with a system.

* * * * *